United States Patent [19]

Simpson

[11] 4,377,850

[45] Mar. 22, 1983

[54] HAND-HELD MEASURING AND CALCULATING DEVICE

[76] Inventor: Roy Simpson, 3936 El Rovia Ave., El Monte, Calif. 91731

[21] Appl. No.: 809,183

[22] Filed: Jun. 23, 1977

[51] Int. Cl.³ .............................................. G01B 3/12
[52] U.S. Cl. .................................... 364/561; 33/142; 364/709
[58] Field of Search .......... 235/151.3, 151.32, 92 DN, 235/152, 156; 33/121–124, 125 M, 125 R, 141 R, 142, 141 E, 137–139; 242/84.8; 364/561, 562; 200/30 R, 30 A, 386

[56] References Cited

U.S. PATENT DOCUMENTS

| 3,525,829 | 8/1970 | Miller | 200/38 C |
| 3,654,449 | 4/1972 | Boyce | 235/156 |
| 3,777,126 | 12/1973 | Hoff | 235/156 |
| 3,916,174 | 10/1975 | Moule | 235/92 DN |
| 3,999,298 | 12/1976 | Nishimura | 33/141 R |
| 4,031,360 | 6/1977 | Soule, Jr. | 33/139 |

Primary Examiner—Errol A. Krass
Attorney, Agent, or Firm—Sellers and Brace

[57] ABSTRACT

A self-contained, hand-held measuring device utilizing a roller mounted on a miniature electronic calculator to actuate the "constant" integrating circuit as the roller rolls along a surface to be measured. The calculator keyboard is usable to make and display various calculations using the results of measured distances, as well as for calculating purposes generally.

8 Claims, 4 Drawing Figures

HAND-HELD MEASURING AND CALCULATING DEVICE

This invention relates to measuring devices, and more particularly to a versatile, hand-held measuring device having a measuring roller for actuating the constant integrating circuit of a miniature electronic calculator and the results of which measuring operations can then be processed in a variety of ways by operation of the calculator keyboard.

This invention has been developed to meet the needs of engineers, architects, estimators, appraisers, merchants and the like for an extremely small, light-weight, portable measuring device to provide a wide variety of measurements and calculations with minimum resort to mental functions on the part of the user.

Efforts to meet these needs have been made heretofore but these are subject to various limitations and disadvantages eliminated by this invention. For example, the U.S. Pat. No. to Boyce 3,654,449 utilizes a specially designed desk supported calculator to which various measuring probes can be connected by flexible cables and its complex circuitry is described as permitting the use of probes having different scale factors. Only the probes themselves are hand-held and the complete assembly is far too bulky and heavy to be carried in the hand, nor is it suited for field use. Moule U.S. Pat. No. 3,916,174 has even more serious limitations. Not only is it designed for fixed installation adjacent yardage to be measured but it is specially designed for use in measuring and calculating the cost of dispensed yardage of a particular width, there being no means for measuring or calculating the price of material having a different width. Nor does this device have provision for area measurements in units other than yards, nor can it make cubic measurements and calculations nor in fact any calculations except total cost of measured yardage. These severe limiting characteristics greatly restrict the utility of the Moule device.

The foregoing and other limitations and disadvantages of prior measuring and calculating devices are avoided by the present invention wherein a miniature pocket type electronic calculator is provided with a measuring actuator for its constant integrating circuit. The complete device is readily grasped in one hand and rolled along a surface to be measured as the measured increments are displayed in the readout window. The keyboard controls may then be manipulated to perform any desired arithmetic functions on the readout values. The keyboard is also usable to convert the increments of known length measured by the measuring roller to any other value using an appropriate conversion factor. The detachable handle is readily assembled to the main body when it is desired to make measurements along the pavement, a floor, a ceiling, or other surface not at a convenient hand height.

Accordingly, it is a primary object of this invention to provide a unique, hand-held measuring and calculating device embodying a miniature electronic calculator for making a variety of measurements and using the calculator keyboard for performing any of a wide variety of arithmetic functions on the results.

Another object of the invention is the provision of a self-contained hand-held electronic measuring device for making linear, area and cubic measurements and having a calculator keyboard and associated circuitry for performing any desired arithmetic functions on the results.

These and other more specific objects will appeared upon reading the following specification and claims and upon considering in connection therewith the attached drawing to which they relate.

Referring now to the drawing in which a preferred embodiment of the invention is illustrated:

Figure 1:
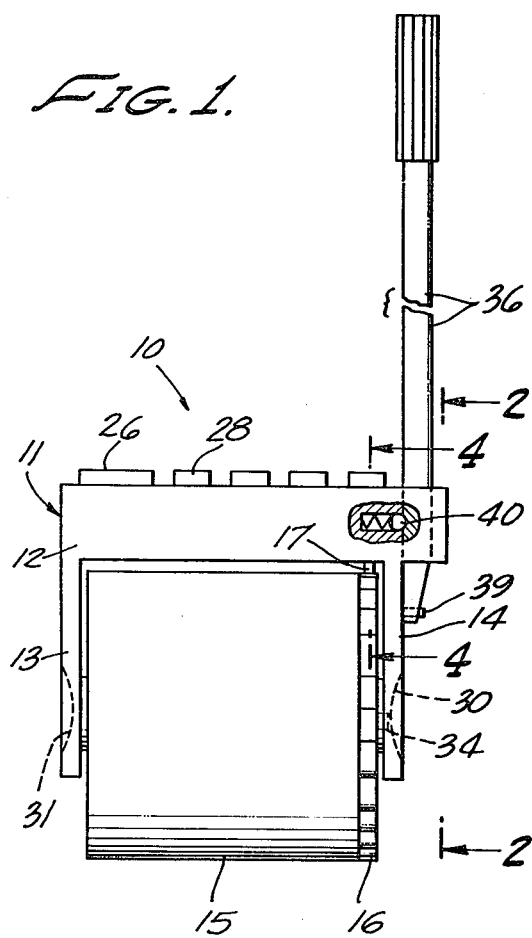
FIG. 1 is a front elevational view of an illustrative embodiment of the invention assembled to a detachable maneuvering handle.

Referring initially more particularly to FIG. 1, there is shown an illustrative embodiment of the invention measuring and calculating device designated generally 10. This device comprises a miniature electronic calculating unit 11 of well known construction and of a size readily carried in a garment pocket. This unit has a housing 12 provided with a pair of brackets 13,14 between the lower ends of which a measuring roller 15 is journalled. This roller is preferably provided with a roughened surface making good frictional contact with a surface along which it is being rolled.

One end of roller 15 is provided with a ring of radially-disposed camming corrugations or undulations 16 the crests of which engage the rounded outer end of a button 17 reciprocally supported in an opening 18 of housing 12. Button 17 is held resiliently in contact with undulations 16 by a spring strip 19 anchored to the interior of housing 12 by a fastener 20. When button 17 is pressed inwardly by one of the crests of undulations 16 the contact on the free end of strips 19 makes electrical contact with a contact 22 fixedly supported within the calculator housing thereby closing integrating circuit of the calculator via leads 23,24. This circuit is also known as the "constant" circuit representative of an increment of rotation of roller 15. The integrating circuit is connected to the digital display units visible through display window 26 of the calculator. Each closure of the contacts of the integrating circuit represents any selected measuring unit value such as one quarter inch.

Figure 3:
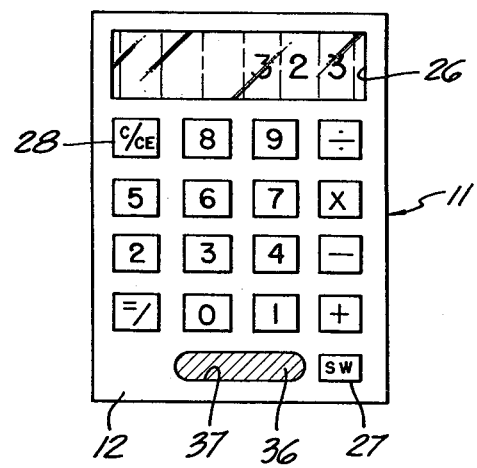
FIG. 3 is a cross-sectional view taken along line 3—3 on FIG. 2.

The upper face of the calculator 11 is equipped with a suitable keyboard, such as that shown in FIG. 3, by which the calculator circuit can be utilized to perform a wide variety of arithmetical functions, the results of which are displayed in window 26. The keyboard has a battery control switch 27, a reset or clearance button 28 as well as buttons for introducing any selected numerical values into the calculator as well as adding, subtracting, multiplying and division control buttons.

In use, measuring device 10 is typically held in one hand astride the calculator 11 with the fingertip and thumb of one hand seated in the recesses 30,31 formed in the exterior surface of brackets 13,14. Switch 27 being turned on, roller 15 is pressed against yardage, a wall, a floor or the like to be measured and rolled therealong in a straight path, clearance button 28 being first depressed to erase any value showing in the digital display window 26 at the start of each measuring excursion. As the device is rolled in a clockwise direction, the crests of the ring of undulations 16 depress button 17 sequentially to actuate the constant value integrating circuit during each increment of rotation of roller 15. The summation of these increments is immediately displayed in window 26 either as a whole number representing a single unit or as a fractional part of a unit. For example, if roller 15 is designed to measure in increments of ¼", the constant of the integrating circuit could be designed to display the result as a fraction, namely 0.25 or as 1. If the display is the fraction 0.25 the operator would divide the result of a given measurement by 12 to convert the reading to feet or by 36 to convert the reading to yards. If on the other hand the readout is in whole numbers, then he would divide the result by 48 to convert the reading to feet or by 144 to convert to yards.

Figure 2:
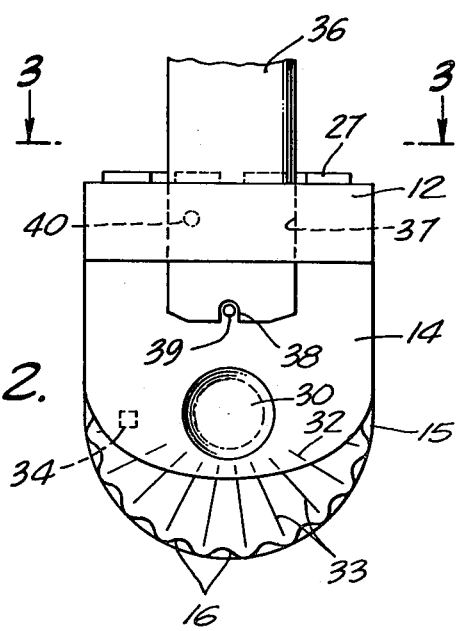
FIG. 2 is a fragmentary view taken along line 2—2 on FIG. 1.
Figure 4:
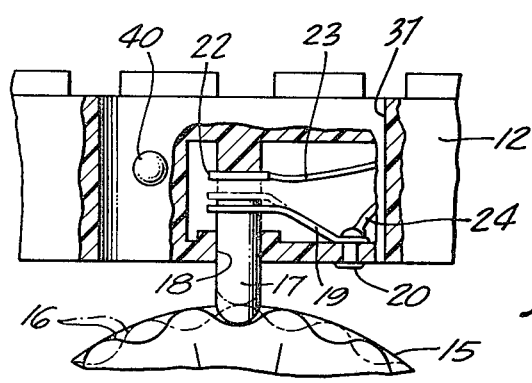
FIG. 4 is a fragmentary partial cross-sectional view taken along line 4—4 on FIG. 1.

Preferably, retrograde movement of roller 15 is safeguarded against by an annular ring of saw teeth 33 formed in the face of roller 15 (FIG. 2). These teeth cooperate with a spring pressed detent 34 mounted in a well on the inner wall of bracket 14 with its inner end riding over teeth 13. This detent and the associated ring of teeth permit rotation of the roller in only one direction.

If the user desired to measure off a 10 yard length of yardage or some other material, and the readout is designed to display a whole number for each quarter inch measured, or 144 units per yard, the user employs the keyboard to determine the total increments in 10 yards by multiplying 144×10 which gives 1440 units. He then resets the display to zero and aligns the high edge of one of the teeth 33 with one of the radial lines 32 along the lower edge of bracket 14. This precaution assures that the roller is in a true zero position in readiness to measure a full increment. The operator holds the roller in this position and places it against the advance end of the yardage with the roller axis directly over the advance edge and rolls the roller along the yardage until the readout displays the number 1440. The value of the selected material can then be computed after clearing the readout and using the keyboard to multiply the number of yards by the price per yard and adding on the sales tax.

Areas and cubic volumes are readily measured and computed by the same technique. Areas require measurement of the width and length. As each result is obtained, the reading is converted to inches, feet, yards, or rods, by dividing the same by the proper conversion factor. The resulting width and length results are then multiplied to obtain the area in the chosen square units. A similar procedure is followed in obtaining cubic measurements.

Measurements made along floors, pavements, walls, ceilings, etc. are facilitated by coupling a manipulating handle 36 of suitable length to device 10. Handle 36 has a snug fit through an opening 37 in housing 11 and a notch 38 in its lower end seats over a pin 39 protruding from bracket 14. A spring-pressed ball detent 40 seats in a cooperating depression in the adjacent side of handle 36 to secure the latter detachably assembled to housing 11.

While the particular hand-held measuring and calculating device herein shown and disclosed in detail is fully capable of attaining the objects and providing the advantages hereinbefore stated, it is to be understood that it is merely illustrative of the present preferred embodiment of the invention and that no limitations are intended to the detail of construction or design herein shown other than as defined in the appended claims.

I claim:

1. A self-contained hand-held measuring and calculating device comprising:
   a housing rotatably supporting roller means positioned for and driven by rolling contact with a surface to be measured;
   miniature electronic calculator means mounted in said housing provided with digital readout display means and connected to a constant value integrating circuit controlled by an activating switch operable to close said circuit on each operation of said switch; and
   non-electrical mechanical camming means on said roller means operable to actuate said switch each time said roller means rotates through an equal value increment in the same direction and thereby effective to display on said display means the aggregate number of increments of rotation of said roller means over a surface undergoing measurement.

2. A measuring device as defined in claim 1 characterized in that said electronic calculator means is provided with manually operable digital keyboard controlled circuitry for performing a selected one of a plurality of arithmetic functions and displaying the results on said readout display means whereby the user can quickly utilize measurement results to make a variety of calculations.

3. A measuring device as defined in claim 1 characterized in that said device is sized to be grasped and supported in one hand while resting said roller means in rolling contact with a surface to be measured.

4. A measuring device as defined in claim 1 characterized in the provision of elongated handle means projecting therefrom and the outer end of which can be grasped in the user's hand to support said roller means in contact with a surface to be measured.

5. A measuring device as defined in claim 4 characterized in the provision of coupling means for holding said handle means detachably assembled to said device.

6. A measuring device as defined in claim 1 characterized in that said camming means comprises a ring of equally spaced protrusions on said roller means operatively connected to said switch operable to actuate said switch as said roller means rotates.

7. A measuring device as defined in claim 1 characterized in the provision of means for preventing rotation of said roller except in a preselected operating direction thereof.

8. A measuring device as defined in claim 1 characterized in that said calculator means includes reset button means for resetting said readout display means to zero.

* * * * *